United States Patent
Nanba et al.

(10) Patent No.: US 9,460,484 B2
(45) Date of Patent: Oct. 4, 2016

(54) CONTROL APPARATUS FOR DISPLAYING VEHICLE INFORMATION SYNTHESIZED WITH EXTERNAL INFORMATION

(71) Applicant: CALSONIC KANSEI CORPORATION, Saitama (JP)

(72) Inventors: Tomomichi Nanba, Saitama (JP); Mitsuo Hagiuda, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 19 days.

(21) Appl. No.: 14/364,709

(22) PCT Filed: Dec. 27, 2012

(86) PCT No.: PCT/JP2012/083921
§ 371 (c)(1),
(2) Date: Jun. 12, 2014

(87) PCT Pub. No.: WO2013/121690
PCT Pub. Date: Aug. 22, 2013

(65) Prior Publication Data
US 2014/0320528 A1    Oct. 30, 2014

(30) Foreign Application Priority Data

Feb. 14, 2012    (JP) .................................. 2012-029150

(51) Int. Cl.
*G06G 5/00*        (2006.01)
*G06T 5/50*        (2006.01)
(Continued)

(52) U.S. Cl.
CPC .............. *G06T 3/0012* (2013.01); *B60K 35/00* (2013.01); *G01C 21/3667* (2013.01);
(Continued)

(58) Field of Classification Search
CPC ...................... G09G 2340/12; G09G 2340/14; G09G 2340/145; G09G 2380/10; G09G 5/14; B60K 2350/106; B60K 2350/1064; B60K 2350/1072; B60K 2350/352; B60K 2350/403; B60K 35/00; B60K 37/02; G06T 11/60; G06T 2207/20221; G06T 3/0012; G06T 5/50; G06T 7/004; G01C 21/3667; G01C 21/3697
USPC .................................. 345/629; 340/438, 462
See application file for complete search history.

(56) References Cited

U.S. PATENT DOCUMENTS

2003/0156097 A1    8/2003  Kakihara et al.
2008/0309475 A1*  12/2008  Kuno ..................... B60K 35/00
                                                                 340/462

(Continued)

FOREIGN PATENT DOCUMENTS

JP    2003/244343    8/2003
JP    2005-207781    8/2005

(Continued)

OTHER PUBLICATIONS

International Search Report (ISR) issued Feb. 12, 2013 in International (PCT) Application No. PCT/JP2012/083921.

*Primary Examiner* — Jin-Cheng Wang
(74) *Attorney, Agent, or Firm* — Wenderoth, Lind & Ponack, L.L.P.

(57) ABSTRACT

The main object of the present invention is to enable image synthesis without obscuring important displays and information. This vehicle display control apparatus includes a display control unit (4) that can display vehicle information obtained from a vehicle information input unit (3) on a display device (1). The display control unit (4) includes an image-processing unit (7) that can image-synthesize the vehicle information from the vehicle information input unit (3) on an external image from an external information terminal (2) and displays the image-synthesized image on the display device (1). Further, this image-processing unit (7) comprises: a displayable area-setting unit (11) that searches for a non-important section within the external image and sets the section as a displayable area (A); and an image-synthesizing unit (12) that image-synthesizes the vehicle information on the displayable area (A).

9 Claims, 9 Drawing Sheets

(51) Int. Cl.

| | |
|---|---|
| *G06T 3/00* | (2006.01) |
| *G01C 21/36* | (2006.01) |
| *B60K 35/00* | (2006.01) |
| *G09G 5/14* | (2006.01) |
| *G09B 29/10* | (2006.01) |
| *G06T 7/00* | (2006.01) |
| *G06T 11/60* | (2006.01) |

(52) U.S. Cl.
CPC ............ *G01C 21/3697* (2013.01); *G06T 5/50* (2013.01); *G06T 7/004* (2013.01); *G06T 11/60* (2013.01); *G09B 29/106* (2013.01); *G09B 29/108* (2013.01); *G09G 5/14* (2013.01); *B60K 2350/106* (2013.01); *B60K 2350/1064* (2013.01); *B60K 2350/1072* (2013.01); *B60K 2350/1096* (2013.01); *B60K 2350/352* (2013.01); *G06T 2207/20221* (2013.01); *G09G 2340/12* (2013.01); *G09G 2340/14* (2013.01); *G09G 2340/145* (2013.01); *G09G 2380/10* (2013.01)

(56) References Cited

U.S. PATENT DOCUMENTS

| | | | |
|---|---|---|---|
| 2008/0316009 A1* | 12/2008 | Nagata | ............ B60K 35/00 340/438 |
| 2012/0008048 A1* | 1/2012 | Sekine | ............ A63F 13/10 348/566 |
| 2012/0038685 A1 | 2/2012 | Tanaka et al. | |

FOREIGN PATENT DOCUMENTS

| | | |
|---|---|---|
| JP | 2006-270231 | 10/2006 |
| JP | 2010-130553 | 6/2010 |
| JP | 2010-176030 | 8/2010 |
| JP | 2010-230316 | 10/2010 |

* cited by examiner

CONTROL APPARATUS FOR DISPLAYING VEHICLE INFORMATION SYNTHESIZED WITH EXTERNAL INFORMATION

CROSS-REFERENCE TO RELATED APPLICATION

This application claims priority from Japanese Patent Application No. 029150/2012 filed on Feb. 14, 2012, the disclosure of which is herein incorporated by reference.

TECHNICAL FIELD

The present invention relates to a display control apparatus for a vehicle.

BACKGROUND ART

A vehicle such as an automobile is provided with an instrument panel at a front part of a compartment. Such an instrument panel includes a vehicle meter apparatus. This vehicle meter apparatus is constituted as a vehicle measuring instrument unit. Such a vehicle meter apparatus has a display device such as a liquid display.

Recently, multi-function mobile terminals such as smart phones have been significantly developed and have widely been used.

It is reviewed that an external image from an external information terminal such as the multi-function mobile terminal is displayed on the above display device of the vehicle meter apparatus. Meter displays and other external information such as weather information are image-synthesized on the displayed external image (see, for reference, Japanese Patent Application Publication No. 2003-244343, Japanese Patent Application Publication No. 2010-230316).

RELATED ART DOCUMENT

Patent Document

Patent Document 1: Japanese Unexamined Patent Application Publication No. 2003-244343.
Patent Document 2: Japanese Unexamined Patent Application Publication No. 2010-230316.

SUMMARY OF THE INVENTION

However, in technologies described in the above patent documents, a display position of the image-synthesized information is not sufficiently considered. There is possibility that important displays and information may sometimes be obscured since the display position is fixed. The present invention is made in view of the above problems and it is an object of the present invention to image-synthesize the image without obscuring important displays and information.

In order to accomplish the above problems, a display control apparatus for a vehicle according to the present invention includes: a display control unit that displays vehicle information obtained from a vehicle information input unit on a display device, the display control unit including: an external image input unit that inputs an external image from an external information terminal; an external image-displayable-determining unit to determine whether the input external image that is inputted into the external image input unit is displayable on the display device; and an image-processing unit that image-synthesizes the vehicle information from the vehicle information input unit on the external image that is determined to be displayable by the external image-displayable-determining unit and displays the synthesized image on the display device, the image-processing unit including: a displayable area-setting unit that searches for a non-important section within the external image and sets a displayable area for displaying the vehicle information in the searched non-important section; and an image-synthesizing unit that image-synthesizes the vehicle information on the displayable area set by the displayable area-setting unit.

According to the present invention, the following effect can be obtained by the above structure. The display control unit displays the vehicle information from the vehicle information input unit on the display device. Furthermore, the external image from the external information terminal by the external image input unit is inputted to the display control unit. The external image-displayable-determining unit determines whether the external image inputted to the external image input unit is displayable or not. The external image which is determined displayable by the external image-displayable-determining unit is image-synthesized with the vehicle information from the vehicle information input unit by the image-processing unit. The synthesized image is displayed on the display device. As described above, the external image which is not appropriate for display cannot be displayed on the device by the external image-displayable-determining unit. The displayable area-setting unit, which is provided with the image-processing unit, searches for the non-important section of the external image and sets the displayable area in order to display the vehicle information on the non-important section. It is possible to image-synthesize the display image without obscuring the important displays and information by the vehicle information because the image-synthesizing unit image-synthesizes the vehicle information to the display area of the external image set by the displayable area-setting unit.

Thus, by optimizing the sizes and positions of the external image and the vehicle information, and image-synthesizing the external image and the vehicle information, the visibilities of the external image and the vehicle information are improved.

DESCRIPTION OF THE EMBODIMENTS

A vehicle such as an automobile includes an instrument panel provided at a front part of a compartment. This instrument panel includes a vehicle meter apparatus. This vehicle meter apparatus is structured as a vehicle measuring instrument unit, for example. Such a vehicle meter apparatus has a display device such as a liquid display.

Recently, multi-function mobile terminals such as smart phones have been significantly developed and have widely been used.

An external image from an external information terminal such as the above multi-function mobile terminal is displayed on the above display device of the vehicle meter apparatus, and vehicle information is image-synthesized on the displayed external image.

Figure 1:
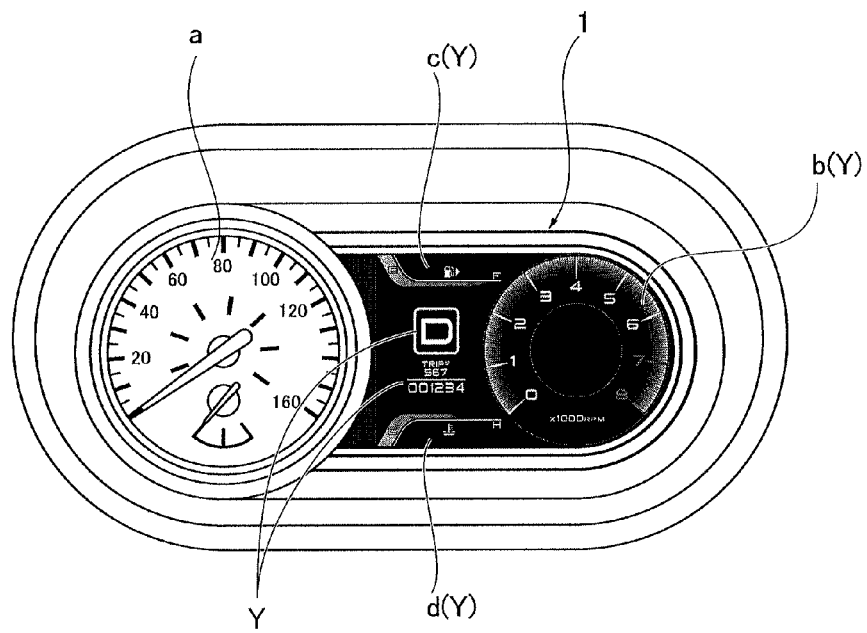
FIG. 1 is a view showing one example of a display device according to a first embodiment of the present invention.

The display device of the vehicle meter apparatus is first described as follows. FIG. 1 shows an example of the foregoing display device.

The vehicle meter apparatus includes a measuring instrument display unit and other display units.

The measuring instrument display unit has a speedometer (a), a tachometer (b), a fuel gauge (c), a thermometer for cooling water (d), and the like. They represent main operation (or driving) information such as vehicle speed information, engine rotation information, fuel residual quantity information, and information of cooling water temperature of the engine.

Other display units have an alarm information display unit and a guidance information display unit.

The alarm information display unit displays information having a high level of important in driving, that is to say, the alarm information. This alarm information includes an oil pressure alarm, a parking brake alarm, a transmission alarm, an engine control system alarm, a charging alarm, an exhaust gas temperature alarm, a seat belt alarm, a door half-opened alarm, an air bag system alarm, an ABS alarm, and the like. In normal use, the alarm information is automatically displayed on the display device when an alarm state occurs. The alarm information is automatically deleted when the alarm state is canceled.

On the other hand, the guidance information display unit displays other information than the above. The other guidance information includes headlamp information, shift position information, direction indicator information, engine rotation speed information, distance information (a travel distance and an integrating distance), and the like. The guidance information includes information always displayed. The guidance information includes information displayed only when it is necessary.

These measuring instrument display units, and the other display units having the alarm information display unit and the guidance information display unit are appropriately displayed at an optimized position of the display device, considering visibility and design.

The above main operation information, the alarm information, the guidance information, and the other display information are collectively called vehicle information. The non-alarm information includes the main vehicle state information, the guidance information, and the other display information. Then, the alarm and the non-alarm information are shown by characters X and Y, respectively.

More specifically, in the case of a normal display as shown in FIG. 1, the speedometer (a) of the measuring instrument display unit is displayed at a left circle part in the drawing. The non-alarm information Y such as the tachometer (b), the fuel gauge (c), the thermometer for cooling water (d), is displayed at a right oval part which the left side thereof is partially cutout in the drawing. The non-alarm information Y, which is composed of the shift position information which is included in the guidance information display unit, the distance information such as the travel distance and the integrating distance, is displayed on the above oval part. In FIG. 1, the alarm information X which is included in the alarm information display unit is not displayed because the alarm state does not occur. The alarm information X is appropriately displayed in the right oval part as needed.

The left circle part is constituted by an analog speedometer a having a pointer. The right oval part is constituted by the display device 1 such as a liquid crystal display and an organic EL display. The left circle part in the drawing can be constituted by the display device 1 such as the liquid crystal display and the organic EL display. Thus, the speedometer a can be displayed on the display device 1. Shapes and structures of the vehicle meter apparatus and the display device 1 are not limited to the above.

Figure 2:
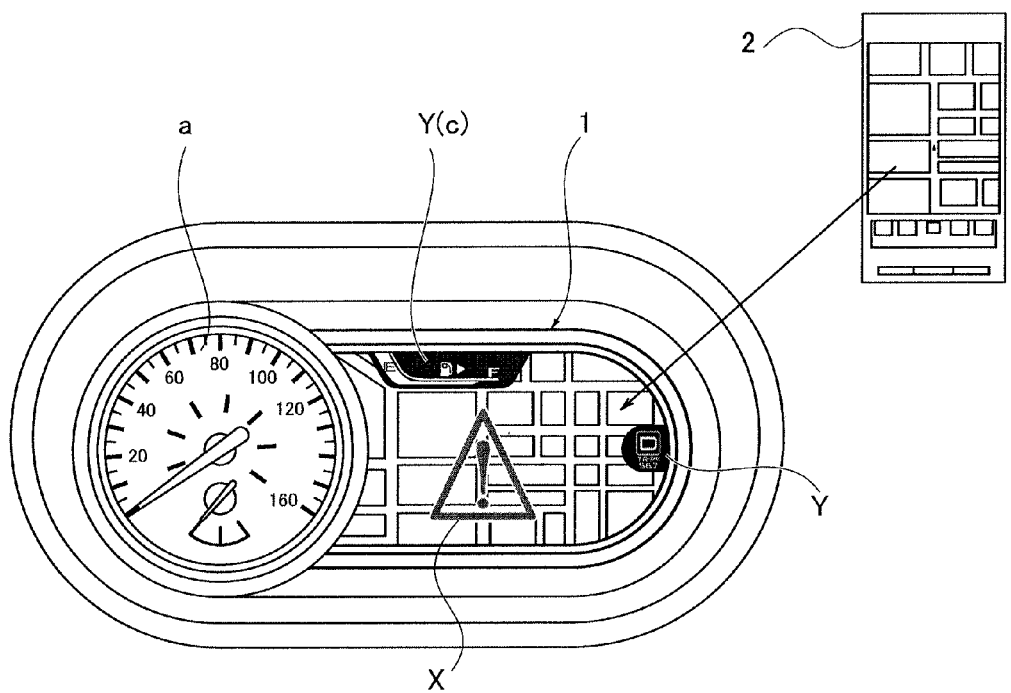
FIG. 2 is a view showing a state displaying an external image as a background image on the display device of FIG. 1, by connecting it to an external information terminal.

FIG. 2 illustrates an external display state in which the external image which is a screen of a multifunction mobile terminal is displayed as a background image on the display device 1 by connecting the multi-function mobile terminal, that is to say the external information terminal 2 such as a smart phone to the display device. On this occasion, the display image on the display device 1 is the same as the above-mentioned image. At least a part of internal displays such as the measuring instrument display and the vehicle information is image-synthesized on the external image and a synthesized image is displayed on the display device. For example, a large icon of the alarm information X is displayed on a center of the display device 1, as an initial display.

The external information terminal 2 means a mobile terminal that can display the image and the like. The external information terminal 2 includes a multi-function mobile terminal such as a smart phone, a mobile-phone, an electronic book, a tablet terminal, and a mobile personal computer.

With reference to the drawings, embodiments of the present invention will be described.

First Embodiment

FIGS. 1 to 7 show a first embodiment and a modification thereof according to the present invention.

A structure of the first embodiment is described as follows.

(Structure 1-1)

Figure 3:
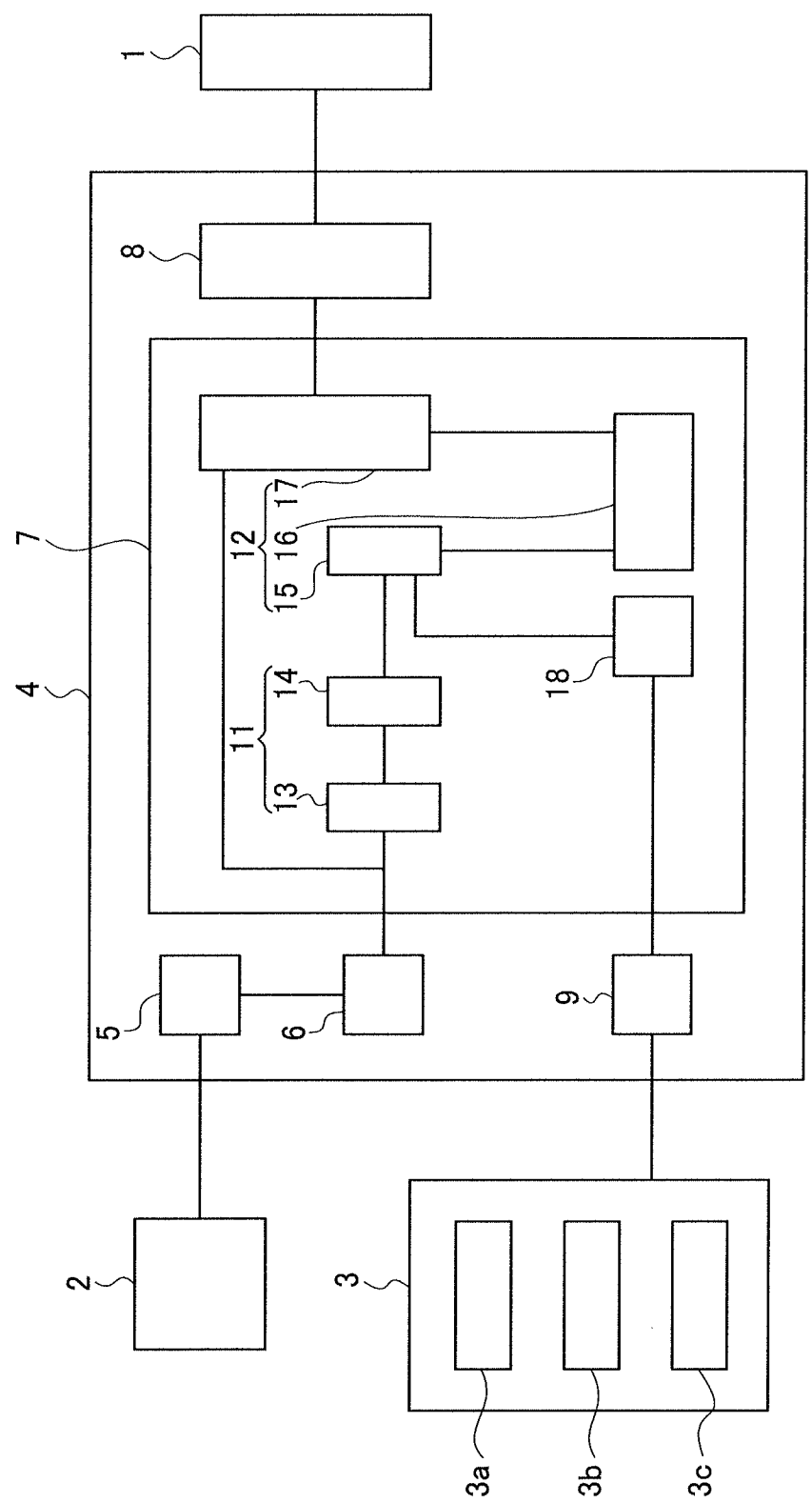
FIG. 3 is a block diagram showing a structure of a vehicle display control apparatus according to the first embodiment of the present invention.

FIG. 3 is a block diagram showing a structure of a display control apparatus for a vehicle in accordance with the first embodiment.

As shown in FIG. 3, the display control apparatus for a vehicle according to the first embodiment includes a display control unit 4 which can display the vehicle information obtained from a vehicle information input unit 3 on the vehicle information display device 1.

The display control unit 4 includes an external image input unit 5 provided in an inside of the display control unit. The external image from the external information terminal 2 can be inputted in the external image input unit 5.

The display control unit 4 also includes an external image-display-determining unit 6 which is provided in an inside of the display control unit 4. This external image-display-determining unit 6 determines whether the external image inputted into the external information terminal 2 is displayable or not.

Further, the display control unit 4 includes in an inside thereof an image-processing unit 7 provided in an inside of the display control unit. This image-processing unit 7 image-synthesizes the displayable external image determined by the external image-display-determining unit 6 on the vehicle information from the vehicle information input unit 3, and displays the synthesized image on the display device 1.

Other than above, the display control unit 4 includes an output unit 8 which outputs the processed image by the image-processing unit 7 to the display device 1, and a vehicle information memory unit 9 which temporarily memorizes and stores the vehicle information from the vehicle information input unit 3.

(Supplementary Description 1-1)

A supplementary description is described as follows.

The foregoing vehicle information input unit 3 is configured to input the vehicle information therein. The vehicle information input unit 3 mainly includes various types of sensors disposed at various parts of the vehicle, other control units using these sensors, and the like, although it is not described in detail. The vehicle information input unit 3 includes an alarm information input unit 3a, a non-alarm information input unit 3b, and a setting input unit 3c.

The display control unit 4 as mentioned above can control the display of the display device 1. For example, the display control unit 4 is mainly composed of a one-chip microcomputer embedded in control software. The control software may be rewritable. The display control unit 4 is configured to perform the following processes by cooperation of the above control software and hardware.

The foregoing external image input unit 5 includes an interface unit to the external information terminal 2. If the external information terminal 2 is connected to a wire-device, a connector is provided. If the external information terminal 2 is connected to a wireless device, the interface unit has a receiving unit. Wireless communications and infrared communications can be used for a receiving method of the receiving unit. In the case of the wireless communication, at least one of wireless communications such as Bluetooth, Wi-Fi, ZigBee, and other short-distance communication methods can be used. It is required that the external information terminal 2 include an interface unit of the display control unit 4. The interface unit of the display control unit 4 may have wire and/or wireless connections. The external image input unit 5 has a function which determines whether a connection to the external information terminal 2 is established or not. The external image input unit 5 also has a function which determines whether the external image is inputted or received or not.

The above external image-display-determining unit 6 determines whether the external image from the external information terminal 2 is appropriate to be displayed or not.

Here, external images which are not appropriate to be displayed are images which cause passenger's attention to excessively attract while driving or prevent safe driving. In addition, the inappropriate images include images violating laws and ethics. Meanwhile, in the case of violating laws and ethics, because there are many cases in which an identification code is inserted in the image data, the device determines whether the images are displayable or not, by the identification code.

More specifically, external images which are appropriate for display displayable images are those with relatively few changes such as pictures, music playback screens, and navigation screens.

Conversely, an external image which is inappropriate for display is a largely changing image such as moving pictures, a game screen, and a screen of application software used by the external information terminal 2.

For example, the external image which is appropriate to display the screen can be determined whether the image is largely changing or not.

For example, in the case of navigation screens, because the screen is varied once every few seconds, the determination is easily performed. In pictures and music playback screens, the images do not almost change or change little. Therefore, it is easily determined whether the pictures can be displayed or not, because pictures and music playback screens change relatively little or are only slightly varied.

In this case, each of pixel data is compared with RGB data for a few frames. When the difference is larger than a predetermined threshold, the device determines that the image is inappropriate for display.

The above image-processing unit 7 can perform various image processes. The image-processing unit 7 can image-synthesize the above external image on the above-mentioned vehicle information and perform various display processes as follows.

The above output unit 8 includes an interface unit to the display device 1.

The above vehicle information memory unit 9 is composed of an internal memory and the like.

(Structure 1-2) Displayable Area-Setting Unit 11

The image-processing unit 7 includes in an inside thereof a displayable area-setting unit 11. The displayable area-setting unit 11 searches for a non-important section of the external image and sets a displayable area A for displaying the above vehicle information in the searched non-important section (ex., see FIG. 4).

The image-processing unit 7 includes an image-synthesizing unit 12 disposed inside the image-processing unit 7. This image-synthesizing unit 12 image-synthesizes the vehicle information on the displayable area A of the external image set by the displayable area-setting unit 11.

(Supplementary Description 1-2)

A supplementary description is described as follows.

Figure 4:
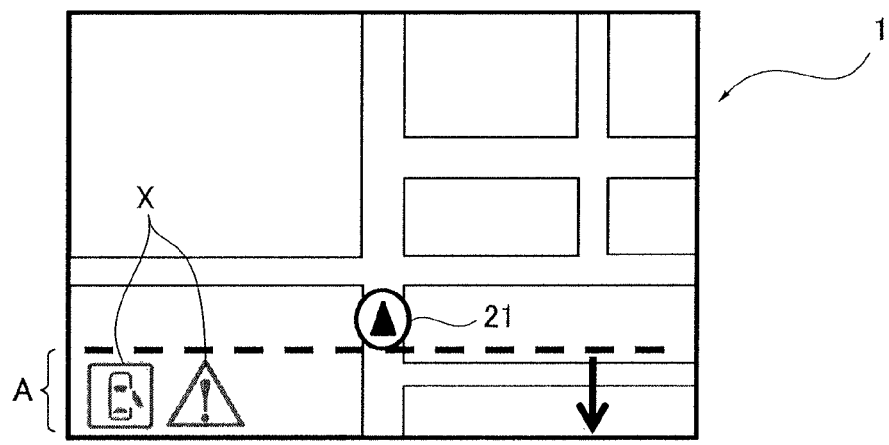
FIG. 4 is a view showing one example of a displayable area in the display device.

Here, the non-important part of the external image means a less important part among the external image. The important part of the external image is often normally displayed in a center portion of the image or in a vicinity of the center portion of the image. Then, a non-important part of the external image may exist in the part except for the center portion of the image. In FIG. 4, a peripheral portion of the external image is recognized as the non-important part.

The "displayable area A" is the best area of the non-important part, in which the vehicle information can be displayed without obscuring the important information of the external image. The best area is, for example, a lower part of FIG. 4. The displayable area A is not limited to one part of the image and may be set to a plurality of parts if it is the non-important part. The size of the displayable area A is changed based on that of the non-important part.

On the other hand, a defined area can be set to the periphery part of the image which is considered as the non-important part of the external image without previously actual investigating whether this part is non-important or not. This defined area is predetermined at the at least one of upper and lower sides, and right and left ends of the display device 1. This defined area is defined by the above control software. The defined area can be added or changed by a later input.

As mentioned above, the displayable area A is the best area which is set by actually searching the non-important part of the external image. Because this displayable area A is varied depending on the external image at any time, it is different from the defined area of a fixed position which is not moved. However, there is possibility that the displayable area A is consistent with the defined area.

The above displayable area-setting unit 11 continues to set the above displayable area A depending on time.

The displayable area-setting unit 11 includes an external image-analyzing unit 13 and an area-calculating unit 14.

The image-synthesizing unit 12 includes an image-synthesizing information-collecting unit 15, an image-synthesizing information memory unit 16, and a display image-adjusting unit 17. The information of the displayable area A from the area-calculating unit 14 and the image data from a vehicle information transform unit 18 are inputted to the image-synthesizing information-collecting unit 15. The image-synthesizing information memory unit 16 stores the information which is prevented from a flicker of the screen. The image-synthesizing information memory unit 16 is composed of an internal memory and so on. This internal memory may be the same as the vehicle information memory unit 9. The external image which can be displayed by the external image-display-determining unit 6 is inputted to the display image-adjusting unit 17.

The image-processing unit 7 includes in an inside thereof the vehicle information transform unit 18. This vehicle information transform unit 18 converts the vehicle information stored in the vehicle information memory unit 9 into image data such as icons. The image data such as the icons are previously stored in the vehicle information transform unit 18. The image data can be added and changed later. Alternatively, the image data such as the icons may be generated in the vehicle information transform unit 18. Various image sizes such as large, middle, and small sizes exist among the image data such as the icons. The display of the image data such as the icons can be enlarged or reduced.

As mentioned above, the iconified vehicle information by the vehicle information transform unit 18 is inputted to the image-synthesizing information-collecting unit 15 together with the information of the displayable area A which is set by the displayable area-setting unit 11.

(Structure 2) Means for Determining the Displayable Area A

The above displayable area-setting unit 11 determines the area whose colors are little changed in the external image as the displayable area.

(Supplementary Description 2)

A supplementary description is described as follows.

Changing of the colors is detected by comparing each of pixel data with the RGB data for a few frames and comparing the changing of the RGB value with the predetermined threshold. When the difference of the colors is less than the predetermined threshold, the image can be displayed in the displayable area A.

The above external image-analyzing unit 13 divides the external image into a plurality of blocks, and makes a color distribution of each block. The area-calculating unit 14 seeks positions and numbers of the blocks which are less than the threshold and inputs these data to the above image-synthesizing information-collecting unit 15.

(Structure 3) Adjusting the Size by the Display Image-Adjusting Unit 17

The above image-processing unit 7 includes the display image-adjusting unit 17 which can adjust the display size of the vehicle information corresponding to the size of the displayable area A.

(Supplementary Description 3)

A supplementary description is described as follows.

In the image-synthesizing unit 12 of the image-processing unit 7, the image-synthesizing information-collecting unit 15 associates the information of the displayable area A inputted from the displayable area-setting unit 11 with the iconified vehicle information from the vehicle information transform unit 18. The associated data is sent to and stored in the image-synthesizing information memory unit 16. The external image via the external image-display-determining unit 6 is directly inputted to the display image-adjusting unit 17. The display image-adjusting unit 17 properly reads the vehicle information which is stored in the image-synthesizing information memory unit 16 and is associated with the displayable area A, and image-synthesizes the associated data to the displayable area A of the above external image.

The display size of the vehicle information is adjusted so as to be consistent with the displayable area A by the display image-adjusting unit 17. The size of the displayable area A is determined depending on the combined shape and the area of the above-mentioned blocks. The display size of the vehicle information is adjusted by selecting the size of the icon so as to be accommodated in the determined displayable area A, or being in the icon enlarged or reduced mode.

The display image-adjusting unit 17 can perform various adjusting processes other than the above processes. For example, in the case of no external image from the external information terminal 2, the display image-adjusting unit 17 can image-synthesize and display the predetermined background image of the vehicle information in a predetermined arrangement. The above background image and the arrangement of the background image can be changed. The setting input unit 3c can perform changes of the background image and the arrangement of the background image.

The display image-adjusting unit 17 can divide the above vehicle information into the alarm information X and the non-alarm information Y. The treatment of the alarm information X can be different to that of the non-alarm information Y. The display device can determine whether the treated vehicle information is the alarm information X or the non-alarm information Y by appending the data to the identification flag when the data is inputted into the alarm information input unit 3a and the non-alarm information input unit 3b.

(Structure 4)

The display image-adjusting unit 17 forcibly displays the alarm information X among the vehicle information in the displayable area A.

(Supplementary Description 4)

A supplementary description is described as follows.

As mentioned above, in a normal use, the alarm information X is automatically displayed on the display device when an alarm state occurs. The alarm information X is automatically deleted when the alarm state is cancelled. Therefore, it is required to forcibly display the alarm information X in the displayable area A.

In this case, for example, a timer (not shown) is provided in the display image-adjusting unit 17. It is possible to perform a magnifying-display of the vehicle information by a set time in the timer (attention evocation time).

Therefore, the display of the alarm information X is divided into an initial display and a late display. It is possible to display the screen so as to distinguish between the initial and late displays.

Figure 5:
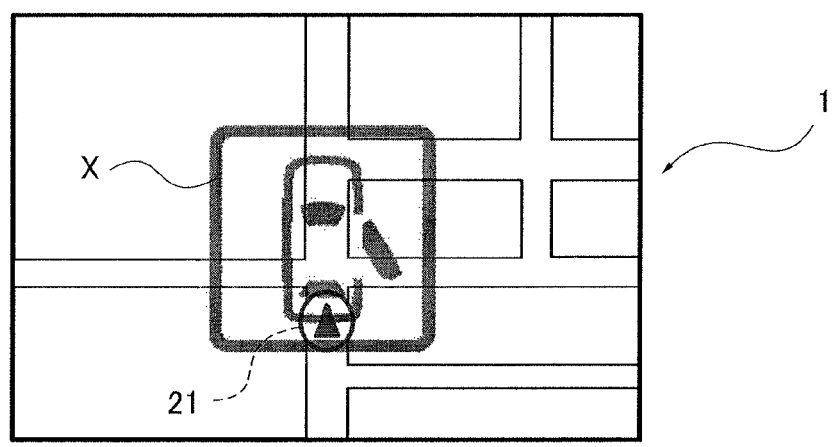
FIG. 5 is a view showing an initial display of alarm information.
Figure 6:
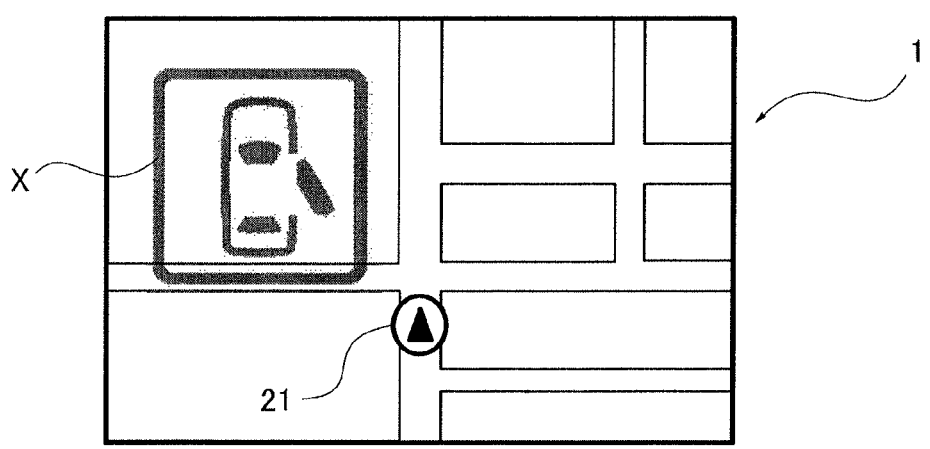
FIG. 6 is a view similar to FIG. 5 in which the alarm information is displayed on a non-important part.

The time of the initial display is required to reliably recognize the attention evocation. As shown in FIGS. 2 and 5, in the attention evocation time, for example a few seconds, the alarm information X is enlarge displayed in the center part of the display device 1. This is called the attention evocation display or the enlarge display. When the important part of the external display, which is displayed on the display device 1, is covered by the alarm information X in the first display, it is inevitable because of the priority of the alarm information X. As shown in FIG. 6, it is possible that the alarm information X be enlargedly displayed in the area which is slightly deviated from the center of the display device 1, or the displayable area A, such that the important part of the external display to the alarm information X is not covered or minimized an overlapped area with other images.

As shown in FIG. 4, for illustrating the late display, the alarm information X is reducible displayed to the initial display, and moves to the displayable area A or the defined area of the display device 1, and is continuously displayed until the alarm state is cancelled. This is called the area display or the reduced display. When the display image-adjusting unit 17 finds the displayable area A, the alarm information X is displayed in the displayable area A. When the display image-adjusting unit 17 does not find the displayable area A, the alarm information X is displayed in the defined area. In the late display, the important part of the display device 1 should not be covered by the alarm information X.

(Structure 5)

The above display image-adjusting unit 17 has a function to selectively display the non-alarm information Y among the vehicle information.

(Supplementary Description 5)

A supplementary description is described as follows.

As shown in FIG. 2, the display image-adjusting unit 17 displays the non-alarm information Y among the vehicle information in the defined area or the displayable area A. The display image-adjusting unit 17 adjusts the screen so as not to overlap the alarm information X with the non-alarm information Y. The non-alarm information Y is selected by the above setting input unit 3c. The selected non-alarm information Y may be prioritized and specified to the display area, when inputting the non-alarm information Y to the setting input unit 3c. For example, this setting input unit 3c is provided with the control panel. The control panel is disposed at the center part in the lateral direction, in the instrument panel. The instrument panel is provided at the front part of the compartment. The set arrangement of the setting input unit 3c is not limited to the above case.

<Function>

A function according to the first embodiment is described as follows.

A normal display will be described in the case that the external information terminal 2 is not connected.

As shown in FIG. 1, the vehicle information from the vehicle information input unit 3 is displayed on the display device 1 by the display control unit 4 in a defined state.

More specifically, as shown in FIG. 3, the vehicle information from the vehicle information input unit 3 is temporally stored in the vehicle information memory unit 9 which is provided in the display control unit 4, and is iconified by the vehicle information transform unit 18. The iconified data is sent from the image-synthesizing information-collecting unit 15 to the display image-adjusting unit 17 via the image-synthesizing information memory unit 16. Because the external image is not inputted from the external information terminal 2, the display image-adjusting unit 17 image-synthesizes the vehicle information with the predetermined background, and properly displays the data in a predetermined arrangement. The display image data adjusted by the display image-adjusting unit 17 is outputted to and displayed on the display device 1 via the output unit 8.

Next, the external display in the case of connecting external information terminal 2 to the display device will be described.

As shown in FIG. 2, the external image from the external information terminal 2 is displayed as the background image on the display device 1 by the display control unit 4. The vehicle information is properly displayed on the displayable area A which is set in the non-important part of the external image.

More particularly, as shown in FIG. 3, the external image from the external information terminal 2 is inputted to the external image input unit 5 of the display control unit 4. The external image-display-determining unit 6 determines whether the external image from the external information terminal 2 is displayable or not. When the external image-displayable-determining unit 6 determines it inappropriate to display on the display device 1, the normal display of FIG. 1 is retained and the external image is not displayed.

After determining whether the image is appropriate to display on the display device 1, the external image is inputted to the display image-adjusting unit 17 of the image-processing unit 7 and is also inputted to the external image-analyzing unit 13 which includes the displayable area-setting unit 11. The external image-analyzing unit 13 divides the external image into a plurality of blocks and makes the color distribution of each block, for example the RGB matrix. The area-calculating unit 14 compares the color distribution of each block obtained from the external image-analyzing unit 13 with the above threshold. The area-calculating unit 14 seeks positions and numbers of the blocks which are less than the threshold and inputs these data to the above image-synthesizing information-collecting unit 15. By performing the above process, the displayable area A can be obtained more easily.

In the image-synthesizing unit 12 of the image-processing unit 7, the above image-synthesizing information-collecting unit 15 associates the inputted information of the displayable area A from the displayable area-setting unit 11 with the iconified vehicle information from the vehicle information transform unit 18. The image-synthesizing information-collecting unit 15 sends the associated data to the image-synthesizing information memory unit 16. The image-synthesizing information memory unit 16 stores the above data. The external image which is passed in the external image-display-determining unit 6 is directly inputted to the display image-adjusting unit 17. The display image-adjusting unit 17 searches for the vehicle information associated with the displayable area A which is stored in the image-synthesizing information memory unit 16, as needed, and image-synthesizes the associated data with the image which is depicted on the displayable area A of the external image. The adjusted display image by the display image-adjusting unit 17 is output to and displayed on the display device 1 via the output unit 8.

When the external image is not inputted from the external information terminal 2, the display is returned to the normal display of FIG. 1.

Figure 7:
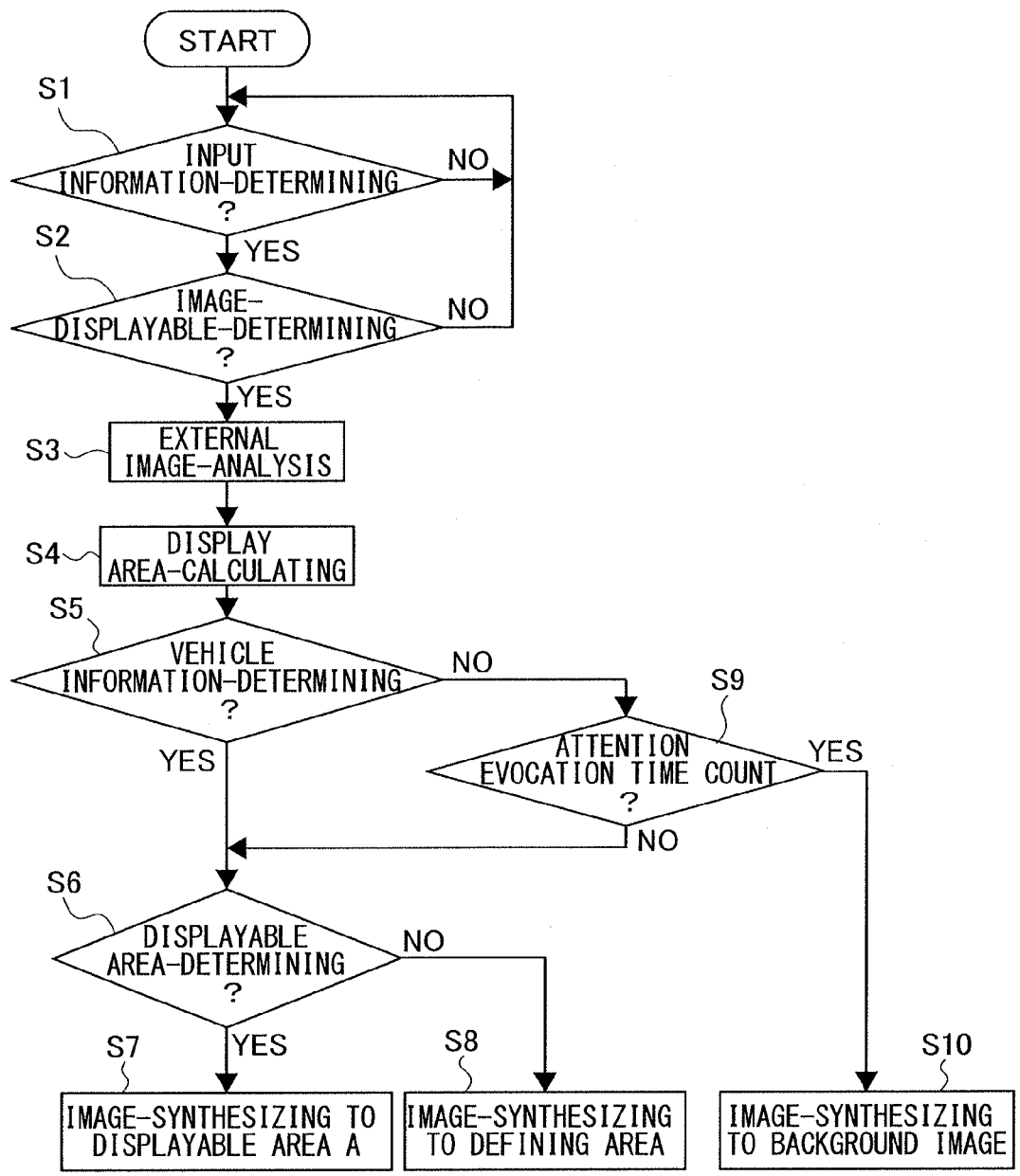
FIG. 7 is a flowchart showing a part of an operation of a display control unit to which the external information terminal is connected, when a normal image is displayed.

FIG. 7 is a flowchart showing a part of a function of the display control unit 4 in the case of connecting the external information terminal 2 to the display device when performing the above normal display.

In step S1, the display control unit 4 performs an input information-determining process in which the external image input unit 5 determines whether the external image from the external information terminal 2 is inputted or not. When the image is inputted (YES), the process proceeds to step S2. Conversely, when the image is not inputted (NO), the above normal display is continuously displayed, and the process returns to step S1 and loops until the image is inputted (YES).

Next, in step S2, the external image-displayable-determining unit 6 performs an image-displayable-determining process which determines whether the above external image is displayable on the display device 1 or not. When the image is displayable (YES), the process proceeds to step S3. When the image is not displayed (NO), the above normal display is continuously displayed, and the process returns to step S1 and loops until the image is inputted (YES). In step S2, once the image is displayable, the processes of step S1 and S2 may be omitted until the external information terminal 2 is disconnected to the display device.

In step S3, the external image-analyzing unit 13 performs an external image-analyzing process which makes the RGB matrix, and the process proceeds to step S4.

In the following step S4, the area-calculating unit 14 performs a display area-calculating process which calculates the displayable area A, and the process proceeds to step S5.

In step S5, the display image-adjusting unit 17 of the image-synthesizing unit 12 performs a vehicle information-determining process which determines whether the inputted vehicle information is the non-alarm information Y which the crew selects to display, or the alarm information X which is forcibly displayed. When the information is the non-alarm information Y (YES), the process proceeds to step S6. Conversely, when the information is the alarm information X (NO), the process proceeds to step S9.

In step S6, a displayable area-determining process which determines whether the displayable area A exists or not, is performed. When the displayable area exists (YES), the process proceeds to step S7, the external image from the external information terminal 2 is treated as the background image, and the vehicle information is image-synthesized in the displayable area A of the background image. When the displayable area does not exist (NO), the process proceeds to step S8, and the vehicle information is image-synthesized in the defined area of the background image (the external image). Adjusting the size of the vehicle information corresponding to the size of the displayable area A or the defined area is performed.

In step S9, when the information is determined as the alarm information X (in the case of NO in step S5), the attention evocation time count process, which determines whether the time is within the attention evocation time or not, is performed. When the time is within the attention evocation time (in the case of YES in step S5), the process proceeds to step 10, the alarm information X that is the vehicle information is synthesized in the external image that is the background image, and the process returns to step S9 and loops (not shown). When the time passes the attention evocation time, the process proceeds to step S6, and performs the displayable area-determining process which determines whether the displayable area A exists or not. When the displayable area exists (YES) in step S6, the process proceeds to step S7, and the vehicle information is image-synthesized in the displayable area A of the external image which is the background image. When the displayable area does not exist (NO) in step S6, the process proceeds to step S8, and the vehicle information is image-synthesized in the defined area of the external image which is the background image. Adjusting the size of the vehicle information corresponding to the size of the displayable area A or the defined area is performed.

The display of the vehicle information which follows the change of the displayable area A is continuously performed by the above flow.

Advantageous Effect

In accordance with the first embodiment, the following effects can be obtained.

(Advantageous Effect 1)

The display control unit 4 can display the vehicle information from the vehicle information input unit 3 on the display device 1.

The display control unit 4 can input the external image from the external information terminal 2 by the external image input unit 5. The external image-displayable-determining unit 6 determines whether the external image inputted to the external image input unit 5 is displayable on the display device 1 or not. The external image which the external image-displayable-determining unit 6 determines displayable is image-synthesized in the vehicle information from the vehicle information input unit 3 by the image-processing unit 7. The synthesized image is displayed on the display device 1.

As described above, the external image which is not appropriate for display cannot be displayed on the device by the external image-displayable-determining unit 6.

The displayable area-setting unit 11, which is provided with the image-processing unit 7, searches for the non-important section of the external image and sets the displayable area A in order to display the vehicle information on the non-important section.

It is possible to synthesize the display image without obscuring the important displays and information by the vehicle information because the image-synthesizing unit 12 image-synthesizes the vehicle information to the display area A of the external image set by the displayable area-setting unit 11. Thus, the visibilities of the external image and the vehicle information are improved by optimizing the sizes and positions of the external image and the vehicle information, and image-synthesizing the vehicle information on the external image.

(Advantageous Effect 2)

Since the displayable area-setting unit 11 determines the area whose colors change little in the external image as the displayable area A, the displayable area A is correctly recognized.

(Advantageous Effect 3)

Because the display image-adjusting unit 17 of the image-processing unit 7 can adjust the display size of the vehicle information corresponding to the size of the non-important part, the vehicle information can always display the optimized display size which is not prevented from the external image.

(Advantageous Effect 4)

The vehicle information has the alarm information X and the non-alarm information Y such as the vehicle information and the guidance information. By separating the alarm information X from the non-alarm information Y, high priority information can be distinguished from other information.

Because the display image-adjusting unit 17 forcibly displays the alarm information X in the displayable area A, overlooking of the alarm information X can be prevented.

(Advantageous Effect 5)

Since the display image-adjusting unit 17 can arbitrarily display the non-alarm information Y which is selected by the crew, the design of the display image can be customized.

Second Embodiment

Figure 8:
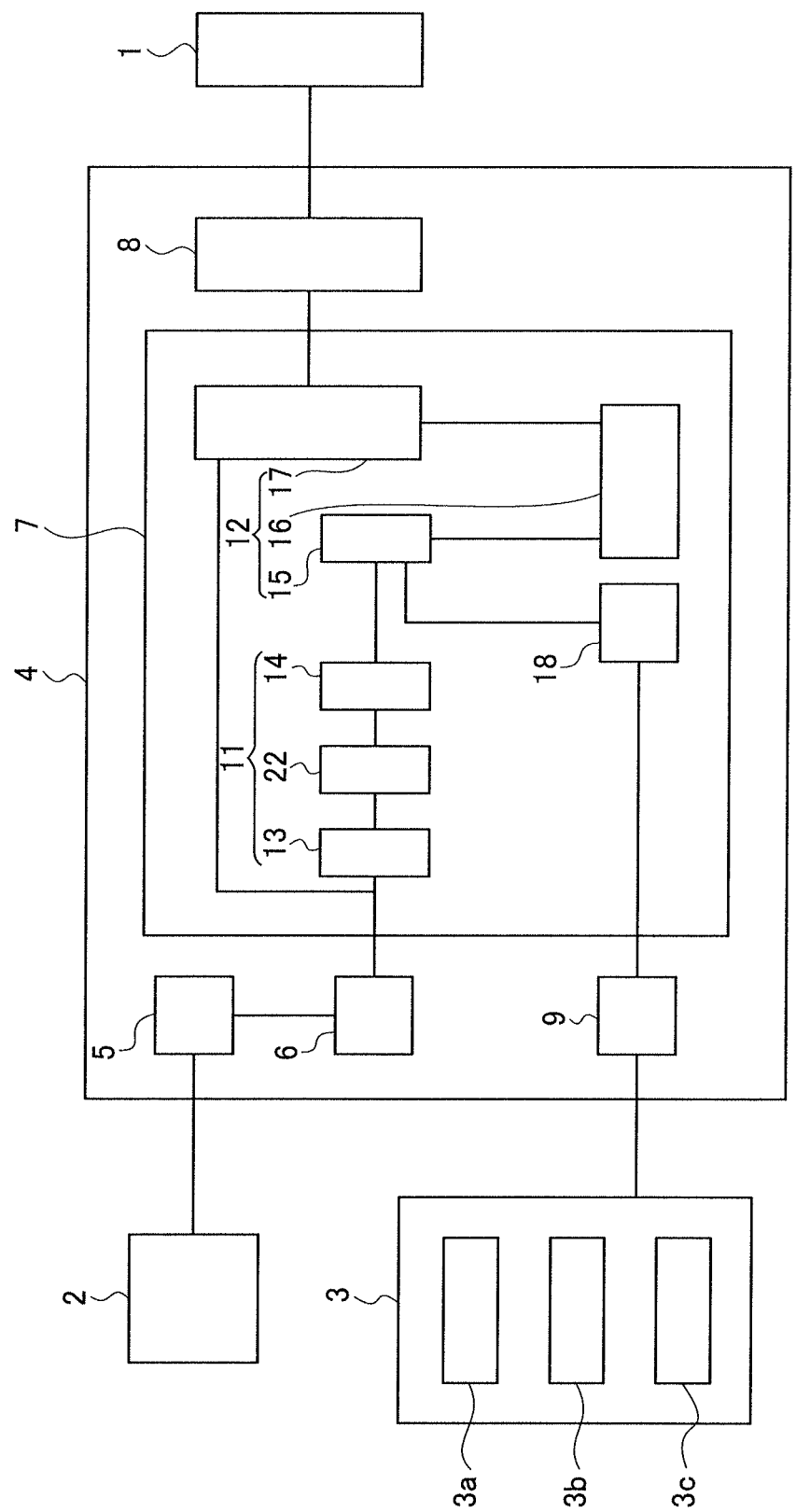
FIG. 8 is a block diagram showing a structure of the vehicle display control apparatus in accordance with a second embodiment of the present invention.
Figure 9:
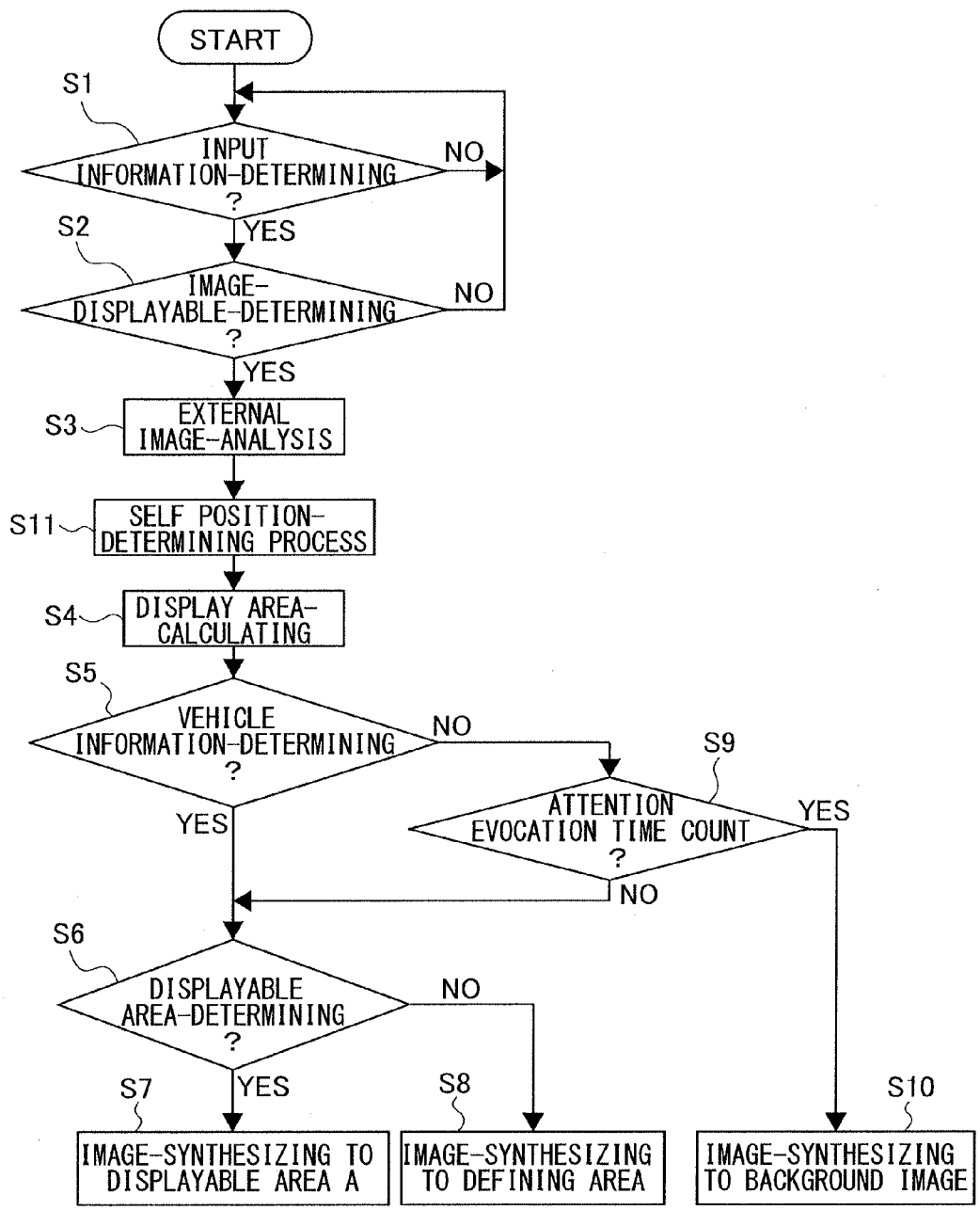
FIG. 9 is a flowchart showing a part of an operation of the display control unit in accordance with the second embodiment of the present invention.

FIGS. 8 and 9 are drawings showing the second embodiment.

The structure of the second embodiment is similar to that of the first embodiment. Thus, the description of the same parts is omitted and only differences between the first and second embodiments are described hereinafter. However, the part in which the description is omitted is similarly shown in the description and the drawing of the foregoing embodiment.

(Structure 6) Self Position-Determining Unit

In the second embodiment, as shown in FIG. 8, the image-processing unit 7 includes a self position-determining unit 22 which can decide a self position 21 (see, for example, FIG. 4) if the external image is a navigation screen.

(Supplementary Description 6)

A supplementary description is described as follows.

The external image-display-determining unit 6 determines whether the external image is a navigation screen or not.

Because the navigation screen mainly contains character information, a line-shape showing a road, a broken-line shape, an edge shape, a geometric shape such as a rectangle, or the like, the navigation screen can be distinguished from the pictures and the music playback screen.

Furthermore, in the navigation screen, since slight displacement or rotation of the map data having almost the same shapes often occurs, the navigation screen can be distinguished from the picture and the music playback screen by recognizing this slight movement of the overall figure.

The self position-determining unit 22 is provided between the external image-analyzing unit 13 of the displayable area-setting unit 11 and the area-calculating unit 14.

In the self position-determining unit 22, the self position 21 is decided as follows.

Normally, the self position 21 is displayed as a specific shape or mark in the neighborhood of the center of the screen in the navigation screen. A slight change of the size and position of the self position often occurs. Thus, the self position 21 can be specified by comparing with each of pixel data for a few frames and searching for the movement of the specific shape in the neighborhood of the center of the screen or the pixel group whose size is slightly changed. In this case, the self position 21 can be considered as the position of the vehicle.

FIG. 9 is a flowchart showing a function of the second embodiment. In FIG. 9, a self position-determining process as step S11 is inserted between steps S3 and S4.

(Advantageous Effect 6)

Because the self position-determining unit 22 of the image-processing unit 7 specifies the self position 21 in the navigation screen, the self position 21, which is the important information, can be prevented from being obscured by the vehicle information. Even when the self position 21 is moved, the vehicle information can also prevent from obscuring the self position 21.

Because the process of the self position-determining unit 22 is performed before the process by the area-calculating unit 14, the displayable area A can be calculated in the state which is removed from the self position 21. The displayable area A can be calculated more easily and precisely.

Third Embodiment

FIGS. 10 to 13 are drawings showing the third embodiment.

The structure of the third embodiment is similar to that of the first and second embodiments. Thus, the description of the same parts is omitted and only differences between the first and second embodiments are described.

(Structure 7) Route Guidance Display-Determining Unit

Figure 10:
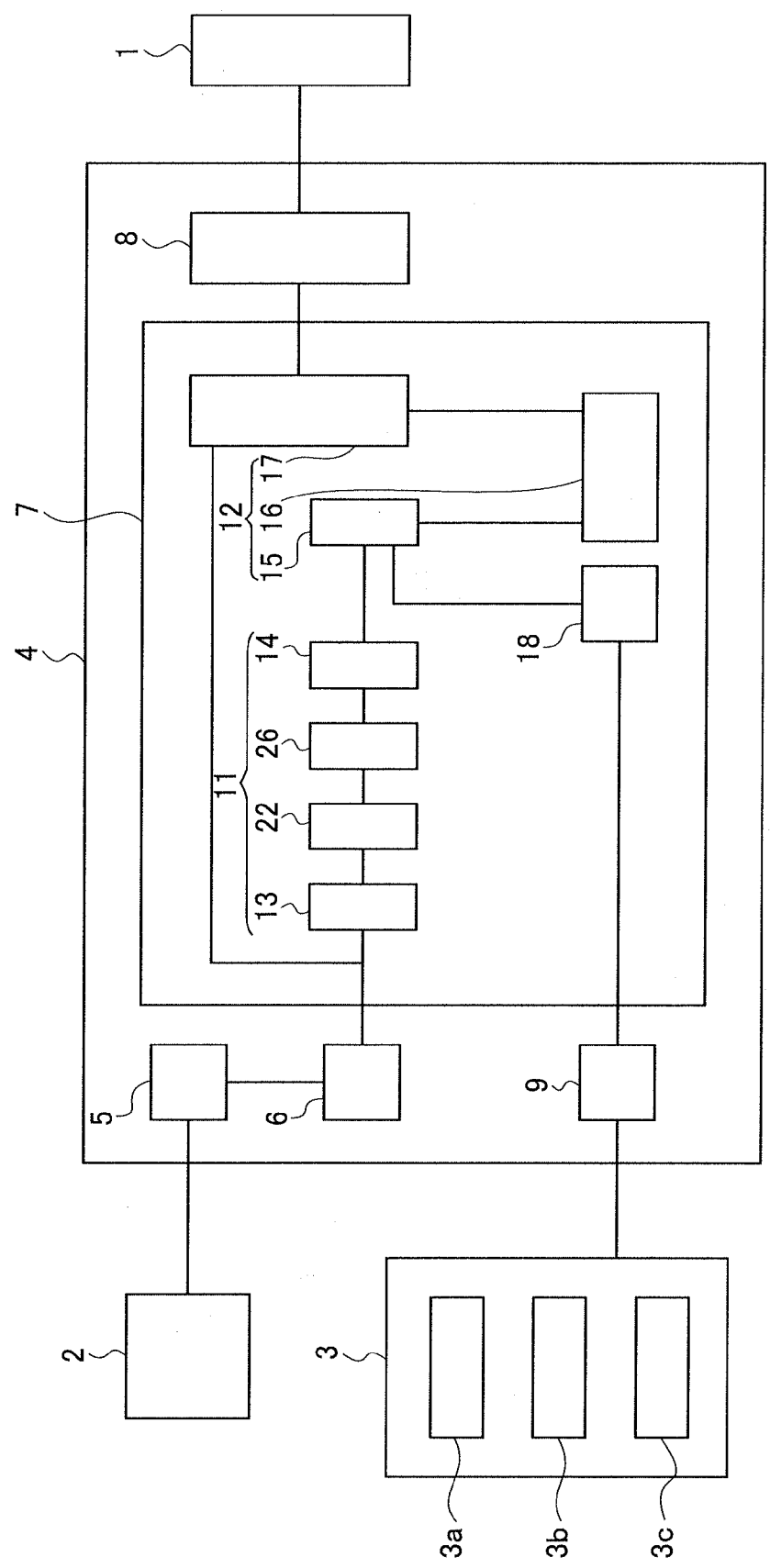
FIG. 10 is a block diagram showing a structure of the vehicle display control apparatus in accordance with a third embodiment of the present invention.

In the third embodiment, the image-processing unit 7 includes a route guidance display-determining unit 26 which can determine a route guidance display 25 when displaying route guidance (see FIG. 12) on the navigation screen, as shown in FIG. 10.

(Supplementary Description 7)

A supplementary description is described as follows.

The route guidance display-determining unit 26 is disposed between the self position-determining unit 22 of the displayable area-setting unit 11 and the area-calculating unit 14.

In the route guidance display-determining unit 26, the route guidance display 25 is specified as follows.

Remarkable colors are normally used in the route guidance display 25, compared to the other parts. The above remarkable colors can be specified by measuring the difference of the chroma of the color. The route guidance display 25 is extended from the self position 21 to the exterior of the image. Thus, the route guidance display 25 can be specified by searching for the area and the direction of the remarkable colors.

Figure 11:
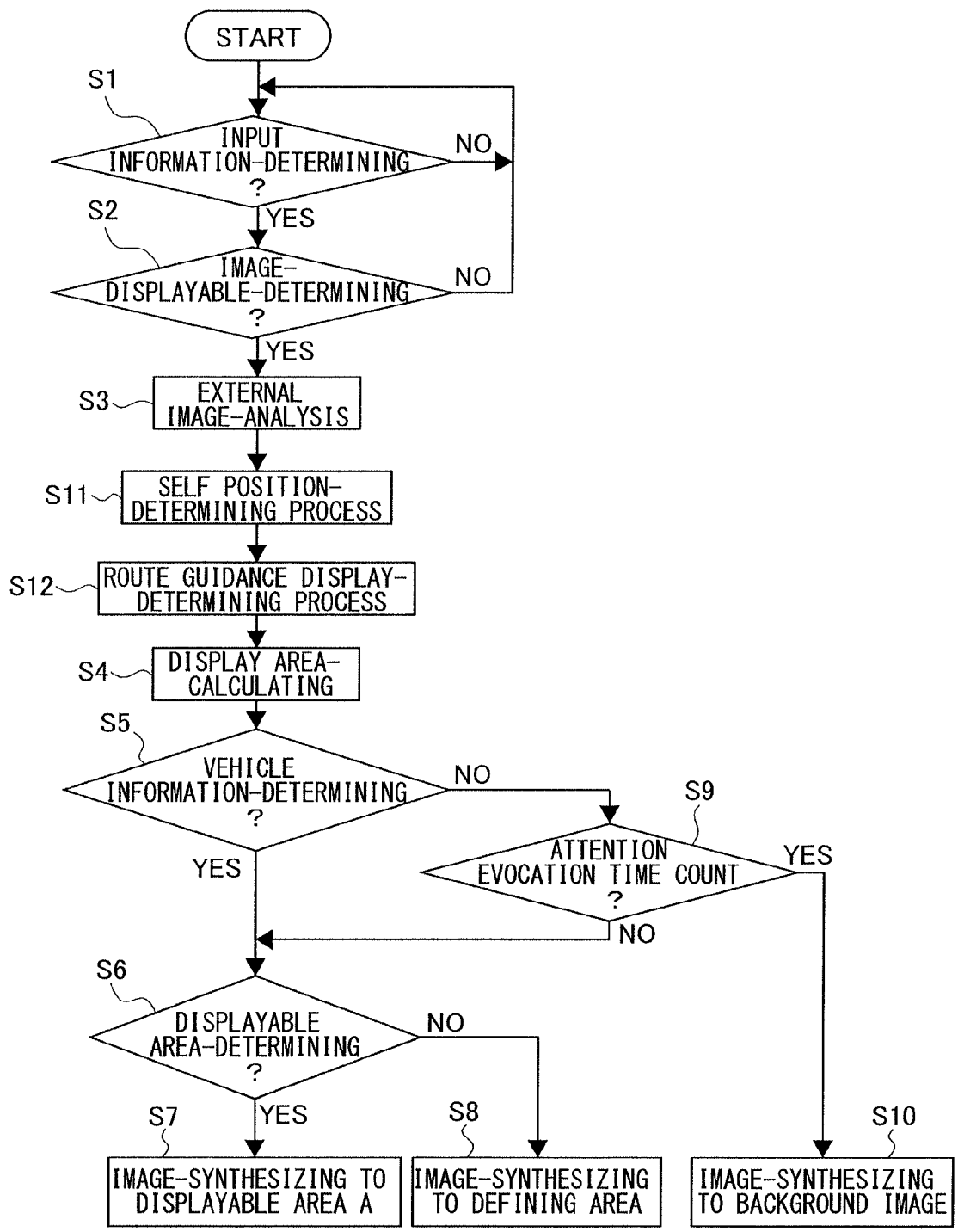
FIG. 11 is a flowchart showing a part of an operation of the display control unit in accordance with the third embodiment of the present invention.

FIG. 11 is a flowchart showing a function of the third embodiment. In FIG. 11, the process which determines the route guidance display 25 in the route guidance display-determining unit 26 is performed between the step S11 and step S4 of FIG. 9.

(Advantageous Effect 7)

Figure 12:
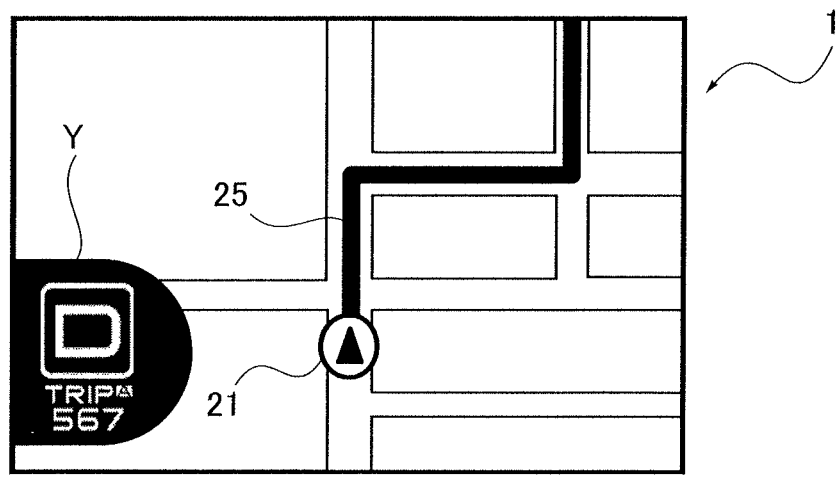
FIG. 12 is a view showing a state where vehicle information is displayed on a display device by avoiding a route guidance display.
Figure 13:
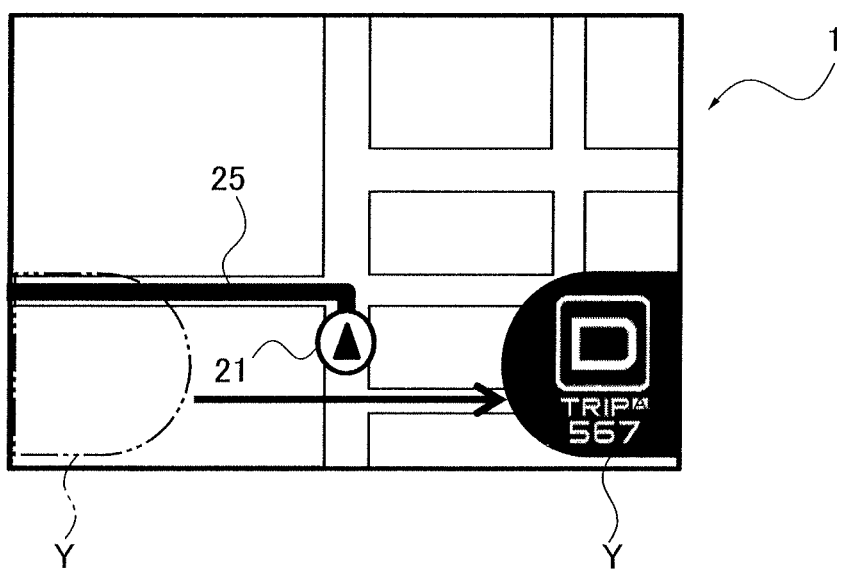
FIG. 13 is a view showing a state where the vehicle information is displayed on the display device by avoiding the route guidance display when the route guidance display is changed.

Because the route guidance display-determining unit 26 of the image-processing unit 7 specifies the route guidance display 25 in the navigation screen, the route guidance display 25, which is the important information, can be prevented from being obscured by the vehicle information. As shown in FIGS. 12 and 13, even when the route guidance display 25 is changed, the route guidance display 25 can also be prevented from being obscured by the vehicle information. The change of the route guidance display 25 can be reflected by continuously performing the flow of FIG. 11. However, a loop of the determining process, which detects the change of the route guidance display 25, may be included.

Although the embodiments of the present invention have been described in detail with reference to the drawings, the embodiments of the present invention are only exemplary. The present invention is not limited to only the structures of the embodiments. Design change within a scope without departing the gist of the present invention is included in the present invention. For example, in the case of including a plurality of the structures in the embodiments, other possible combinations of these structures are included. In the case of showing a plurality of the embodiments and modifications, other possible combinations of these structures are included. The structures depicted in the drawings are included in the present invention, even if not described explicitly in the description. In the case of including a term such as "and/or the like", this term is used to include the same kind. In the case of including terms such as "substantially", "about", and "extent" and the like, these terms are used to include a well-balanced range and precision.

INDUSTRIAL APPLICABILITY

A display unit of a car navigation system, a car audio system, and other built-in electronic units can be displayed on a similar synthesizing image, instead of a vehicle meter apparatus such as the display device 1 of a vehicle measuring instrument unit.

Descriptions of Reference Numerals
1 vehicle information display device
2 external information terminal
3 vehicle information input unit
4 display control unit
5 external image input unit
6 external image-display-determining unit
7 image-processing unit
11 displayable area-setting unit
12 image-synthesizing unit
17 display image-adjusting unit
21 self position
22 self position-determining unit
25 route guidance display
26 route guidance display-determining unit
A displayable area
X alarm information (vehicle information)
Y non-alarm information (vehicle information)

The invention claimed is:

1. A display control apparatus for a vehicle, the vehicle control apparatus comprising:
a processor; and
a non-transitory memory having stored thereon executable instructions, which when executed, cause the processor to perform:
inputting an external image from an external information terminal;
determining whether the external image is displayable on a display device; and
when the external image is determined to be displayable on the display device, (i) searching for a non-important section within the external image, (ii) setting a displayable area for displaying obtained vehicle information in the searched non-important section, (iii) image-synthesizing the vehicle information on the displayable area, and (iv) displaying the synthesized image on the display device,
wherein the searching for the non-important section includes (i) determining, for each pixel of the external image, a change in color data over a plurality of frames of the external image and (ii) obtaining, as the non-important section, an area of the external image including pixels having the change in the color data less than a predetermined threshold.

2. A display control apparatus for a vehicle, the display control apparatus comprising:
a processor; and
a non-transitory memory having stored thereon executable instructions, which when executed, cause the processor to perform:
inputting an external image from an external information terminal;
determining whether the external image is displayable on a display device; and
when the external image is determined to be displayable on the display device, (i) searching for a non-important section within the external image, (ii) setting a displayable area for displaying obtained vehicle information in the searched non-important section, (iii) image-synthesizing the vehicle information on the displayable area, (iv) adjusting a display size of the vehicle information corresponding to a size of the displayable area, and (v) displaying the synthesized image on the display device,
wherein the searching for the non-important section includes (i) determining, for each pixel of the external image, a change in color data over a plurality of frames of the external image and (ii) obtaining, as the non-important section, an area of the external image including pixels having the change in the color data less than a predetermined threshold.

3. The display control apparatus according to claim 2, wherein alarm information is forcibly displayed among the vehicle information and/or non-alarm information is selectively displayed among the vehicle information.

4. A display control apparatus for a vehicle, the display control apparatus comprising:
a processor; and
a non-transitory memory having stored thereon executable instructions, which when executed, cause the processor to perform:
inputting an external image from an external information terminal;
determining whether the external image is displayable on a display device;
when the external image is determined to be displayable on the display device, (i) searching for a non-important section within the external image, (ii) setting a displayable area for displaying obtained vehicle information in the searched non-important section, (iii) image-synthesizing the vehicle information on the displayable area, and (iv) displaying the synthesized image on the display device; and
when the external image is determined to be displayable on the display device and the external image is a navigation screen, determining and displaying a self-position of the vehicle,
wherein the searching for the non-important section includes (i) determining, for each pixel of the external image, a change in color data over a plurality of frames of the external image and (ii) obtaining, as the non-important section, an area of the external image including pixels having the change in the color data less than a predetermined threshold.

5. The display control apparatus according to claim 4, wherein a display size of the vehicle information is adjusted to correspond to a size of the displayable area.

6. The display control apparatus according to claim 5, wherein alarm information is forcibly displayed among the vehicle information and/or non-alarm information is selectively displayed among the vehicle information.

7. The display control apparatus according to claim 6, wherein the executable instructions, when executed, further cause the processor to perform determining a route guidance display when displaying route guidance on the navigation screen.

8. The display control apparatus according to claim 5, wherein the executable instructions, when executed, further cause the processor to perform determining a route guidance display when displaying route guidance on the navigation screen.

9. The display control apparatus according to claim 4, wherein the executable instructions, when executed, further cause the processor to perform determining a route guidance display when displaying route guidance on the navigation screen.

* * * * *